United States Patent [19]
Drimak et al.

[11] 4,020,470
[45] Apr. 26, 1977

[54] SIMULTANEOUS ADDRESSING OF DIFFERENT LOCATIONS IN A STORAGE UNIT

[75] Inventors: Edward George Drimak, Johnson City; Thomas Arthur Metz, Endicott, both of N.Y.

[73] Assignee: IBM Corporation, Armonk, N.Y.

[22] Filed: June 6, 1975

[21] Appl. No.: 584,551

[52] U.S. Cl. .......................................... 340/172.5
[51] Int. Cl.² .......................................... G11C 7/00
[58] Field of Search .............................. 340/172.5

[56] References Cited

UNITED STATES PATENTS

| | | | |
|---|---|---|---|
| 3,394,354 | 7/1968 | Senzig | 340/172.5 |
| 3,466,611 | 9/1969 | Weinberger | 340/172.5 |
| 3,602,896 | 8/1971 | Zeheb | 340/172.5 |
| 3,626,374 | 12/1971 | Chinlund | 340/172.5 |
| 3,638,199 | 1/1972 | Kolankowsky et al. | 340/172.5 |
| 3,764,996 | 10/1973 | Ross | 340/172.5 |
| 3,938,100 | 2/1976 | Steiner | 340/172.5 |

*Primary Examiner*—Melvin B. Chapnick
*Attorney, Agent, or Firm*—James E. Murray

[57] ABSTRACT

Two separate address lines are provided for each storage line of local storage. One address line is connected to a first group of bytes and the second address line is connected to the remaining bytes with each storage line containing the same addressing connection. Control circuits are provided for selecting any two address lines where the combination of the two provides access to both byte groups.

1 Claim, 5 Drawing Figures

SIMULTANEOUS ADDRESSING OF DIFFERENT LOCATIONS IN A STORAGE UNIT

This invention relates to addressing storage locations within a data processing system and more particularly to the simultaneous addressing of two different locations in a single local storage unit.

BACKGROUND OF THE INVENTION

Local storage, that is, storage associated with, for example, a processing unit as opposed to the main storage component of a data processing system has typically been accessed in a manner which is singular in nature, that is, one line of storage at a time. Thus, if an array of memory chips are presented with an address, a logically contiguous line is retrieved from that memory. However, it has been recognized in the prior art that it is desirable to have the capability of reading from two lines of local storage simultaneously. This capability has been achieved through the provision of parallel local stores with separate accessing means, each one to provide a line of storage simultaneously on one read operation. Obviously such an arrangement is an expensive solution.

It is, therefore, the primary object of this invention to provide simultaneous addressing to different locations in a single local storage unit so that the total data read from the local store at a single access is composed partly of data bytes from one storage location and partly of data bytes from another storage location. The advantages of such an arrangement are many. One of the major uses of local storage is to store data and addresses which normally would be found in main storage for convenient use within the processor unit. System design has made local storage arrangements profitable because of the time needed to get out of processor data flow and into memory data flow. Where local storage is used to contain main storage addresses it is frequently the case that the main storage address consists of a segment name, for example the name of a control block, and the displacement within that control block to particular data. Thus, to access that particular data, the address read from the local store will consist of the segment name and the displacement. If the addresses of all the particular data in a control block are located in local store, the segment name will be repeated line after line after line with only the displacement value changing in each of these address expressions. Through use of the current invention the segment name may be addressed in a single line and only the displacement address in one of several additional lines, thus creating space on those additional lines which may be used for other purposes. As a result local storage, when arranged according to the present invention, will be available for additional uses.

SUMMARY OF THE INVENTION

Each line of local storage is separated into two groups of bytes, each group being accessed by two separate address connections. By repeating the connection from line to line, access is made to a particular byte group of storage from one line and a different byte group from a second line with one simultaneous access.

BRIEF DESCRIPTION OF THE DRAWINGS

The foregoing and other objects, features and advantages of the invention will be apparent from the following detailed description of a preferred embodiment of the invention as illustrated in the accompanying drawings wherein.

DETAILED DESCRIPTION

Figure 1:
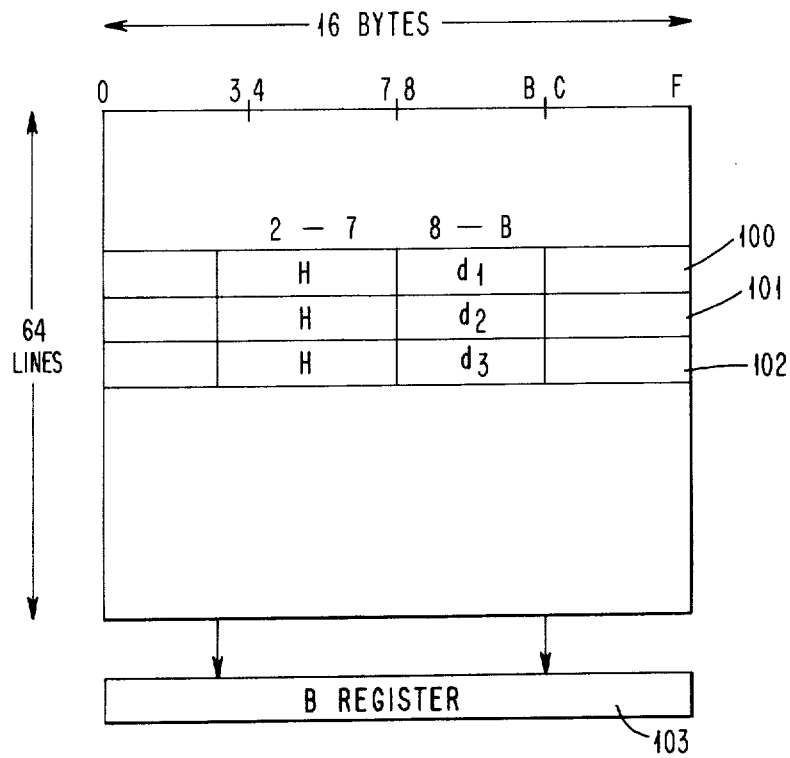
FIG. 1 is a prior art logical representation of a local storage unit.

FIG. 1 is a logical depiction of a local storage as might be found in the prior art. The particular local storage shown is 16 bytes wide, 64 lines deep, and its primary purpose might be to store main storage addresses of data. For example, line 100 is shown to contain the name of a control block between bytes 2 and 7, designated H, and displacement to a particular data in the control block between bytes 8 and Baker (B), designated $d_1$. Similarly, succeeding lines in local storage are shown to contain the name of the particular control block (H) and particular data within that control block situated at displacement $d_2$ in line 101 and $d_3$ in line 102. Any one of these lines can be read out during a local storage access cycle into the B register 103 from which operations can commence for the retrieving of data from main storage or the reading of data into main storage at the address designated in the B register.

It is clear from FIG. 1 that in the case of a system object such as a control block where the H value in each line of storage remains the same, the only address change in accessing different information in that control block is the displacement value. The continued repetition of the 6 byte H in every line of local storage represents wasted space. However, in order to obtain the complete address all ten bytes (bytes 2 to B) must be fed into the B register and from there to the bus for accessing main storage.

Figure 2:
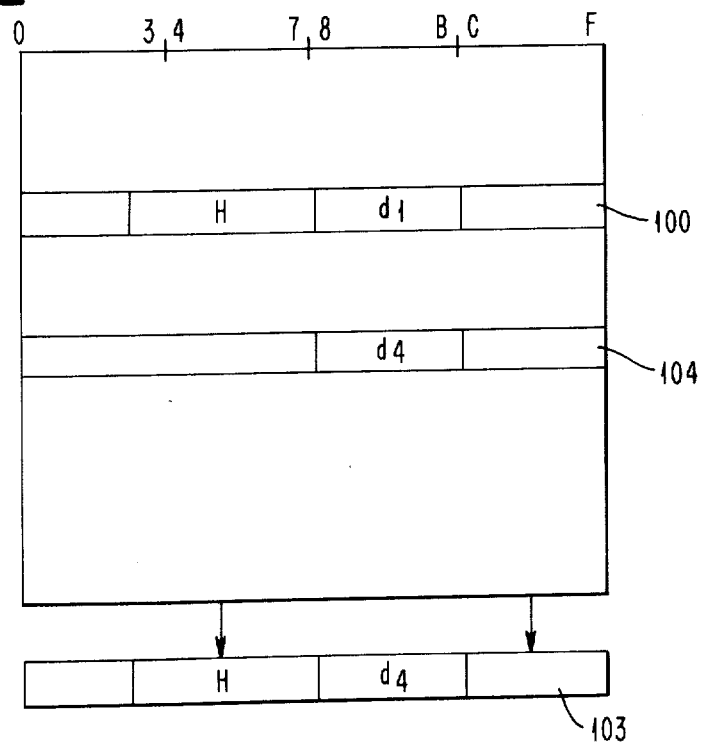
FIG. 2 is a logical representation of a local storage unit according to the invention.

FIG. 2 provides an illustration of what the invention herein is intended to accomplish. Again, a logical depiction of local storage is provided where line 100 shows the segment name (H) at bytes 2 through 7. However, if it is desired to access particular data at displacement 4 ($d_4$) whose address is defined in line 104, then according to this invention bytes 2 through 7 are read out of line 100 while bytes 8 through B are read out of line 104 into the B register 103. Thus, the B register is caused to contain data from two different lines n local store and bytes 2 through 7 in line 104 are made available for the storage of data other than the segment name H.

Figure 3:
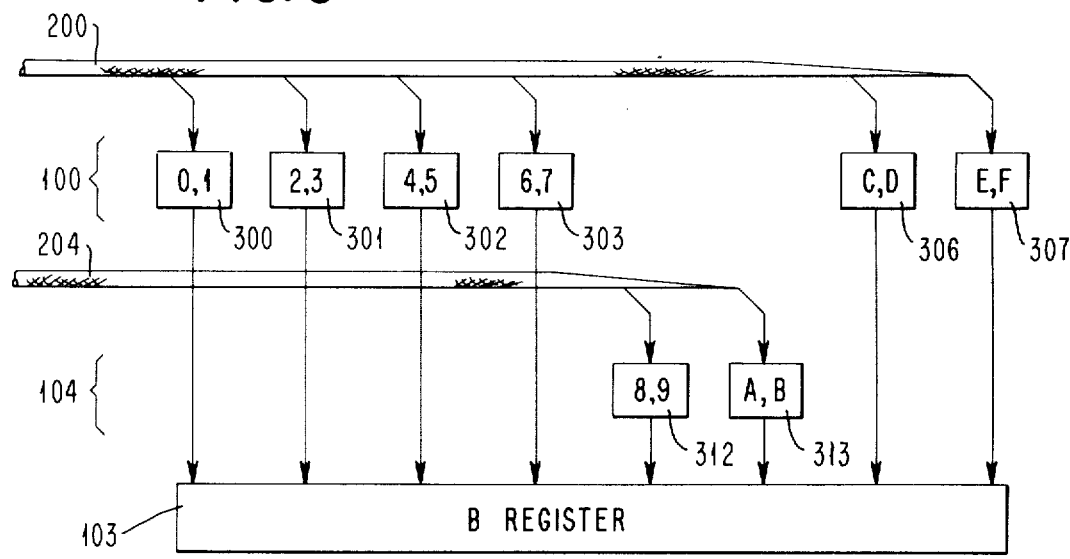
FIG. 3 is a physical representation of an embodiment of the local storage unit.

FIG. 3 shows a simplified physical implementation of a small part of the local store shown in FIG. 2. Local store line 100 is comprised of eight separate memory chips, 300–307, each chip containing two bytes of data. Chips 304 and 305 in line 100 at bytes 8–B are not shown for reasons of simplicity; instead chips 312 and 313 from local store line 104 are shown for these bytes. Chips 300–303 and 306 and 307 are accessed by address cable 200 and chips 312 and 313 are accessed by address cable 204. Consequently, on any one access to local store raising both lines 200 and 204, the result is to access bytes 0–7 and C–F from line 100 and bytes 8–B from line 104. In that manner, B register 103 is caused to contain the H name from line 100 and displacement from line 104.

It is obvious from FIG. 3 and the above explanation that every line of local store will contain two address cables, one for accessing bytes 0–7 and C–F and one for accessing bytes 8–B. Consequently upon which two address cables are raised, any combination of these byte groups from the 64 lines in the example store can be accessed simultaneously.

In the implementation shown in FIG. 3 each array chip physically contains two bytes, that is, each array chip contains 18 bits horizontally and the local store has 8 chips or 16 bytes horizontally in its total. While larger chips are available, the speed of such an array would be slower and consequently chips that are two bytes wide represent a preferred implementation.

It should be noted at this time that while the concept of the invention is not limited to six byte segment names and four byte displacements, as a matter of physical implementation there would be special boundaries which would be selected for the split addressing scheme. Thus, for example, in the implementation of FIG. 3 it would not be possible to split address from bytes 7 through Baker since byte 7 is located on the same chip as byte 6. However, in the implementation shown in FIG. 3 any scheme involving the two byte chip could be utilized. For example, bytes 0 and 1 could be accessed from line 100, bytes 2 and 3 from line 104, bytes 4 and 5 from line 100, bytes 6 and 7 from line 104 and the remaining bytes from either line as one would choose. In any event, there would be split addressing from chips located in one of two lines in the array.

Figure 4:
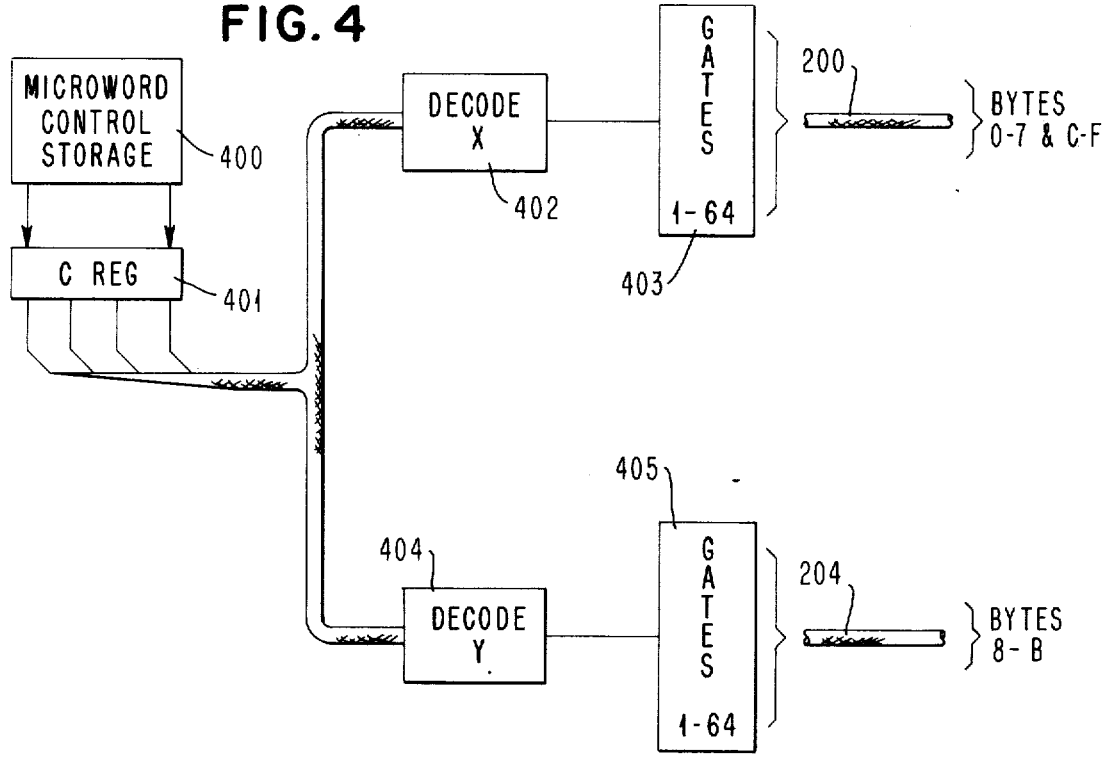
FIG. 4 illustrates the control over the split addressing scheme of FIG. 3.
Figure 5:
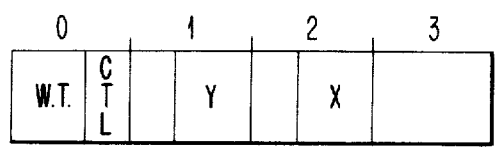
FIG. 5 illustrates a representation of a suitable micro word control.

FIG. 4 shows the control circuits for controlling which bytes in which line are being accessed simultaneously while FIG. 5 shows the format of an illustrative microword which provides the data as to which line in the storage is to contain the segment name and which line is to contain the displacement. For example, in byte 2 (FIG. 5) a particular 5 bits (labeled X) of the microword contain the information as to which of the 64 storage locations is to be accessed for the segment name and 5 bits in byte 1 (labeled Y) represent the information as to which of the 64 lines of storage are to be acrossed for the displacement.

In FIG. 4 note that the various microwords are stored in control storage 400 and are transferred to control register 401 when called for. The specific storage location for X is decoded at 402 with the result that one of 64 gates is closed at 403 providing access to bytes 0 to 7 and bytes C to F as was previously shown in FIG. 3. Similarly, the 5 bits representing the storge location Y in the microword would be decoded at 404 and one of the 64 locations would then be gated at 405 enabling bytes 8 through Baker (B).

It should be noted that indirect addressing could be used where the X and Y address bits could be decoded for accessing an index register or some other indirect addressing means. Generally, FIG. 4 shows the fact that two sets of address lines are controllably raised to obtain data from local store.

FIG 5 shows that a microword for controlling this operation may be 4 bytes wide. Note that in byte 0 of the microword one field designates WT, that is, word type. For example, a storage word would be a type of micro instruction which would call for the accessing of main storage and might be signalized if the first two WT bits are one-zero. Another example of word type is an arithmetic operation and might be signalized if the first two bits were both zeros. If the first two bits were zero-one the word type represented might be a move or shift operation and finally one-one might be a branch. FIG. 5 shows a control field in byte zero in which data is provided which might, for example, indicate that split addressing is to be used. That is, to access local storage to obtain the X location data from byte 2 of the microword and the Y location data from byte 1. Or the control word might indicate single addressing where both the H and the D information are contained in the same line. However, in such case, connections not shown would be needed from either decode 402 or 404 to the other set of gates.

Another aspect of this invention relates to time. For example, in a machine cycle of 132 nanoseconds there may be six clock ranges each of 22 nanoseconds within the cycle. In operation on a particular microword for accessing local storage the first two clock ranges may always be used for local store reads while the next two clock ranges may provide a period for a local store write where the destination of the write is derived from the preceding machine cycle. The last two clock pulses may also be a local store write and may be utilized, for example, in updating the main storage address. Thus, for example, data is read during the first two pulses, a constant may be added to it during the second two pulses, and the updated data may then be written to the local store during the final two pulses. Therefore, the update address operation can occur during one machine cycle.

It should be obvious that such an updating scheme could not be accomplished in one machine cycle if simultaneous access operations were not possible.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a data processing system with a memory system in which data in a block of information is accessed by a control word which has a first section that translates into a portion called the segment field that identifies the block of information containing the data and an entirely different second section that translates into a portion called a displacement field that pinpoints the location of the data within that block, apparatus for receiving that control word and translating it to a real location within the memory system that can be accessed to obtain the data comprising:

a first register for receiving the control word from the data processing system containing a first portion which receives the segment field and a second portion which receives the displacement field;

a local storage unit made up of a plurality of modules each having a plurality of locations containing data for translating control words to actual addresses in the memory system and supplying output signals reprsentative of such data when the local storage unit unit is accessed, said local storage unit including a first group of modules containing data for translating the segment field portion of the control word into part of the actual address and a second group of modules containing data for translating the displacement field portion of the control word into part of the actual address, a first and second decoding means coupled to the first register and said local storage unit for simultaneously and separately accessing the two separate first and second groups of modules respectively in said local storage unit when supplied with a control word from the first register, said first decoding means being coupled only to the first portion of the first register containing the first section of the control word and to said first group of modules in the local storage unit containing data translating said first section to a segment field and said second decoding means coupled only to the second portion of the first register containing the second section containing a translation of the second section into the displacement field, and;

a second register coupled to both the first and second group of modules in said local storage unit for simultaneously storing the output signals of the local storage unit representative of both the segment and displacement fields to form the address of the accessed data in the memory system whereby the displacement and segment fields are independently supplied to the second register.

* * * * *